(12) United States Patent
van der Veen et al.

(10) Patent No.: US 7,461,247 B2
(45) Date of Patent: Dec. 2, 2008

(54) METHOD FOR TRANSITIONING CONTROL OF A PERIPHERAL DEVICE FROM A FIRST DEVICE DRIVER TO A SECOND DEVICE DRIVER DURING OPERATING SYSTEM INITIALIZATION

(75) Inventors: Peter van der Veen, Kanata (CA); Sheridan Ethier, Kanata (CA); Brian Stecher, Kanata (CA); Brian Edmond, Stittsville (CA)

(73) Assignee: QNX Software Systems GmbH & Co. KG, Karlsbad (DE)

( * ) Notice: Subject to any disclaimer, the term of this patent is extended or adjusted under 35 U.S.C. 154(b) by 568 days.

(21) Appl. No.: 11/145,373

(22) Filed: Jun. 3, 2005

(65) Prior Publication Data

US 2006/0277400 A1 Dec. 7, 2006

(51) Int. Cl.
*G06F 9/00* (2006.01)
*G06F 9/24* (2006.01)
*G06F 15/177* (2006.01)

(52) U.S. Cl. .................. 713/2; 713/1; 713/100; 710/8; 710/10; 710/104; 710/260

(58) Field of Classification Search ........ 713/1, 713/2, 100; 710/8, 10, 104, 260
See application file for complete search history.

(56) References Cited

U.S. PATENT DOCUMENTS

| | | | |
|---|---|---|---|
| 5,675,795 A | | 10/1997 | Rawson, III et al. |
| 5,694,600 A | * | 12/1997 | Khenson et al. ............... 713/2 |
| 5,978,912 A | * | 11/1999 | Rakavy et al. ................ 713/2 |
| 6,272,629 B1 | * | 8/2001 | Stewart ....................... 713/2 |
| 6,938,152 B2 | * | 8/2005 | Shin et al. .................... 713/2 |
| 7,000,075 B2 | | 2/2006 | Beckert et al. |
| 7,036,040 B2 | | 4/2006 | Nicholson et al. |
| 7,051,160 B2 | | 5/2006 | Beckert et al. |
| 7,051,326 B2 | | 5/2006 | Goodman |
| 7,174,447 B2 | * | 2/2007 | Zimmer et al. ................ 713/1 |
| 2004/0093489 A1 | | 5/2004 | Hsu |
| 2004/0143696 A1 | | 7/2004 | Hsieh |
| 2004/0260919 A1 | | 12/2004 | Takahashi |

(Continued)

FOREIGN PATENT DOCUMENTS

KR    00008628    *    2/2000

OTHER PUBLICATIONS

Newton Harry, Newton's Telecom Dictionary, Feb. 2002, CMP Books, 18 Ed., pp. 216, 390 and 414.*

*Primary Examiner*—Mark Connolly
(74) *Attorney, Agent, or Firm*—Brinks Hofer Gilson & Lione (57) ABSTRACT

A system for meeting demanding boot time requirements, such as those timing requirement mandated by vehicle telematics systems, is described. Current computer systems use expensive hardware like coprocessors to service requests, such as input/output requests, that have timing requirements which are less than the time required to load the operating system into memory. Instead, a mini-driver may be initialized early in the boot process before the operating system is loaded, to service these requests. For example, the mini-driver may buffer incoming data, and/or reply to incoming messages. After the operating system has loaded, a second device driver may be initialized, and the mini-driver may be transitioned to the second driver.

13 Claims, 10 Drawing Sheets

U.S. PATENT DOCUMENTS

2005/0229042 A1 10/2005 Crowell et al.
2006/0277400 A1* 12/2006 Veen et al. .................. 713/1
2006/0282654 A1 12/2006 Veen et al.

* cited by examiner

METHOD FOR TRANSITIONING CONTROL OF A PERIPHERAL DEVICE FROM A FIRST DEVICE DRIVER TO A SECOND DEVICE DRIVER DURING OPERATING SYSTEM INITIALIZATION

BACKGROUND OF THE INVENTION

1. Technical Field

The invention relates generally to real-time operating systems, and more specifically, to real-time operating systems that need to respond to external events within a limited interval from system boot.

2. Related Art

As systems become more complex, boot time requirements for real time operating systems (RTOS) used in embedded systems continue to increase. For example, the vehicles, such as automobiles, trucks, farming equipment, mining equipment, golf carts, mobile robots and the like, may employ telematics systems, such as GPS navigational systems, wireless communications, automatic driving assistance systems, and the like, which provide a wide variety of useful features. These telematics systems may be driven by a Controller Area Network (CAN) and Media Oriented Systems Transport (MOST®) buses that can transmit messages within a very short time period after the system is powered-on. The telematics systems often need the ability to receive, and possibly respond to, these messages, often within a very short amount of time. These timing requirements may be less than the time required by the RTOS to fully boot and begin running standard device drivers.

For example, a CAN bus master device can send a "Power Up" message to all devices on the bus around 65 ms after the system is powered-on, and the telematics systems must respond to this message within 100 ms. After this initial power-on handshaking sequence, the telematics system may need to buffer (and possibly reply to) additional messages received over the CAN bus at a rate around one message every 10 ms. When coupled with the fact that the first CPU instruction may not executed until 10 ms after power-on, telematics systems must be able to respond to these messages in approximately 55 ms. These demanding boot time requirements make it unlikely that the RTOS will be fully operational before the first "Power Up" CAN message. This may be due to bottlenecks in the booting process such as copying the OS image into RAM. Typical OS boot times from power-on-reset (POR) to starting the first user application may be measured in 100's of milliseconds.

To meet these timing requirements, auxiliary communications processors have been used to supplement the functionality of the RTOSs. For example, when CAN messages are delivered, the auxiliary processor can receive the message and capture any required data. These tasks then can be passed over to a device driver once the OS has loaded. While these auxiliary processors have been incorporated into the embedded systems to meet timing requirements, they can be expensive in a price sensitive market. Moreover, hardware solutions can be difficult and expensive to modify should the need arise. Therefore a need exists for a low-cost, easily modifiable solution for meeting startup timing requirements that is operational and provides limited functionality before the operating system is running.

SUMMARY

A robust system for meeting demanding boot time requirements, such as those timing requirement mandated by vehicle telematics systems, is described. Current computer systems use expensive hardware like coprocessors to service requests, such as input/output requests, that have timing requirements that are less than the time required to load the operating system into memory. Instead, a mini-driver may be initialized early in the boot process before the operating system is loaded, to service these requests. For example, the mini-driver may buffer incoming data, and/or reply to incoming messages. The mini-driver, which may be callable throughout the boot process, may be triggered in a variety of manners, such as through polling or interrupts. After the operating system has loaded, a second device driver may be initialized, and functions of the mini-driver may be transitioned to the second driver. The second device driver may be a typical device driver initialized by a kernel module of the operating system using known methods.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
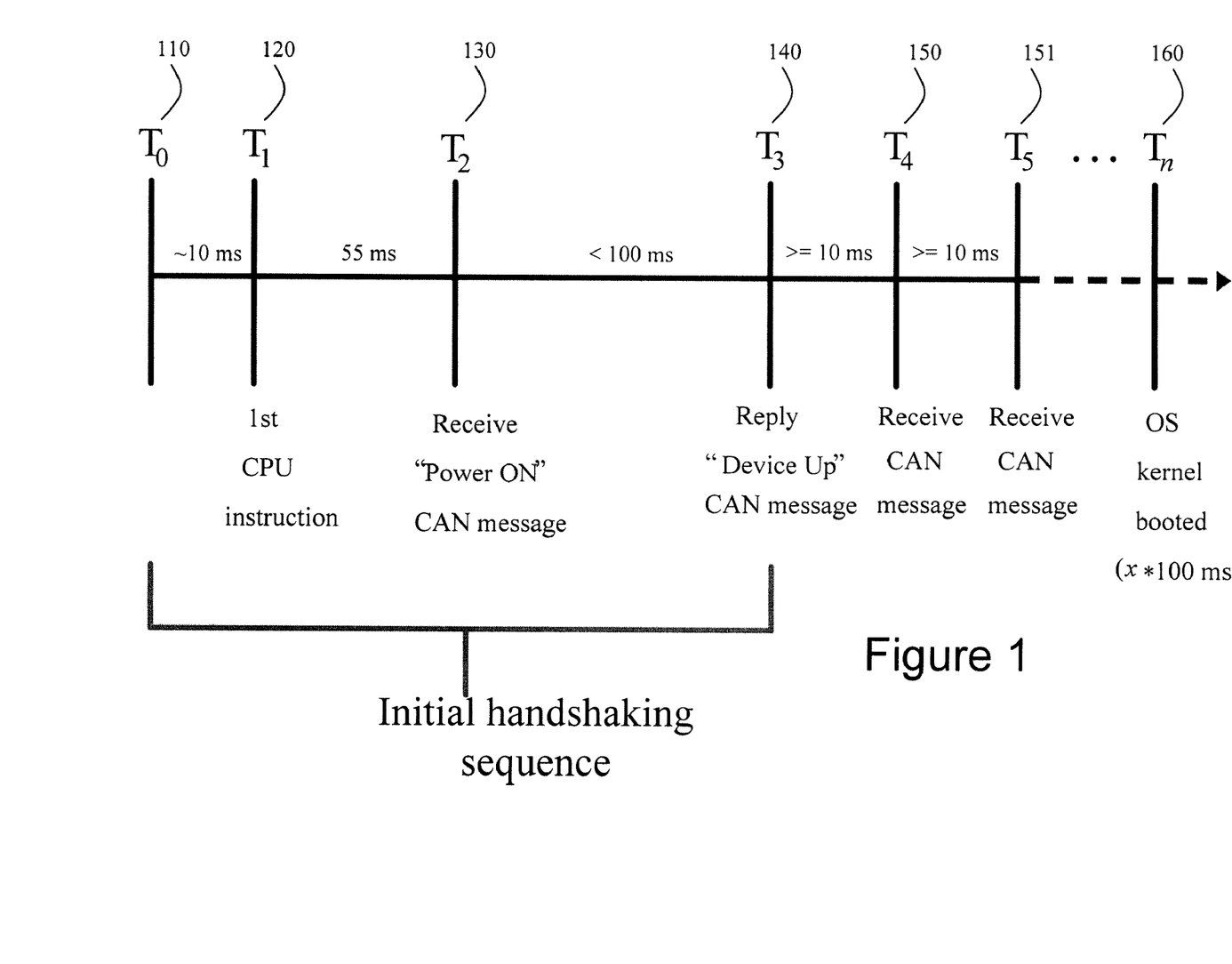
FIG. 1 shows an exemplary boot timing sequence for a vehicular system using a CAN bus master device.

Referring now to the drawings and initially to FIG. 1, a diagram of exemplary boot timing sequence for a vehicular system using a CAN bus master device is shown. As illustrated, the CPU may execute it's first instruction 120 about 10 ms after system power on 110. Approximately 55 ms later, or 65 ms after system power on 110, the CAN bus master device may send a "Power Up" message 130 to all devices on the bus. Any device on the bus, such as a telematics system, must respond 140 to this message within 100 ms. After this initial power-on handshaking sequence, additional messages 150a and 150n may be broadcast over the CAN bus at a rate around one message every 10 ms. As described above, these demanding boot time requirements make it questionable that the RTOS will be fully operational before the first "Power Up" CAN message, as typical OS boot times 160 from power-on-reset (POR) to starting the first user application may be measured in 100's of milliseconds.

Figure 2:
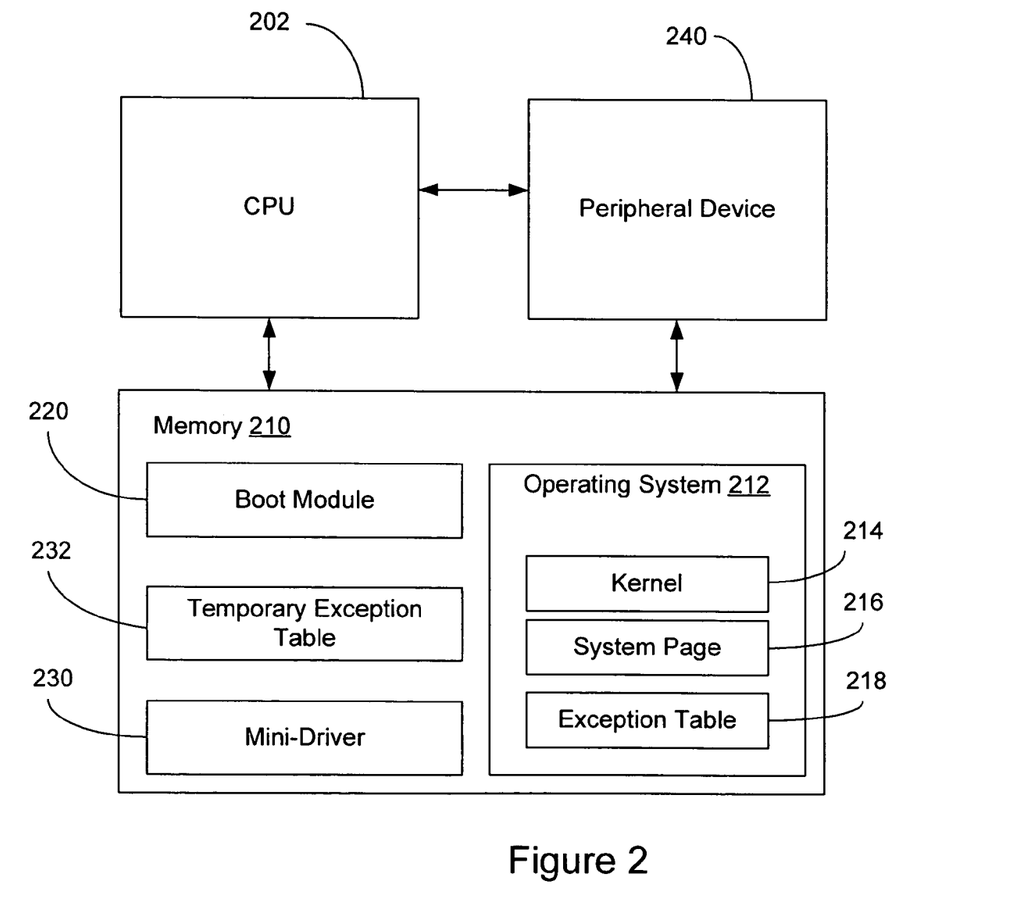
FIG. 2 shows a system for transitioning control of a peripheral device from a first device driver to a second device driver during operating system initialization.

In FIG. 2, an exemplary system 200 for implementing meeting these boot time requirements is shown. As illustrated, the system may include a central processing unit (CPU) 202 for processing instructions stored in memory 210, as well as a peripheral device 240 that may generate and transmit messages. The memory 210 may include an operating system 212 for providing access to system hardware to various applications. Included in the operating system 212 may be a kernel module 212 that provides basic services and a system page 214 hat describes the hardware resources of the system. The operating system 212 may also include an exception table 218. In addition to the operating system, the memory 210 may also include a boot module 222 for booting the system 200. The memory may also include a mini-driver 230 for servicing requests prior to the loading of the operating system 212. A temporary exception table 232 may also be included to allow for interrupt-based triggering of the mini-driver, discussed in more detail below.

Figure 3:
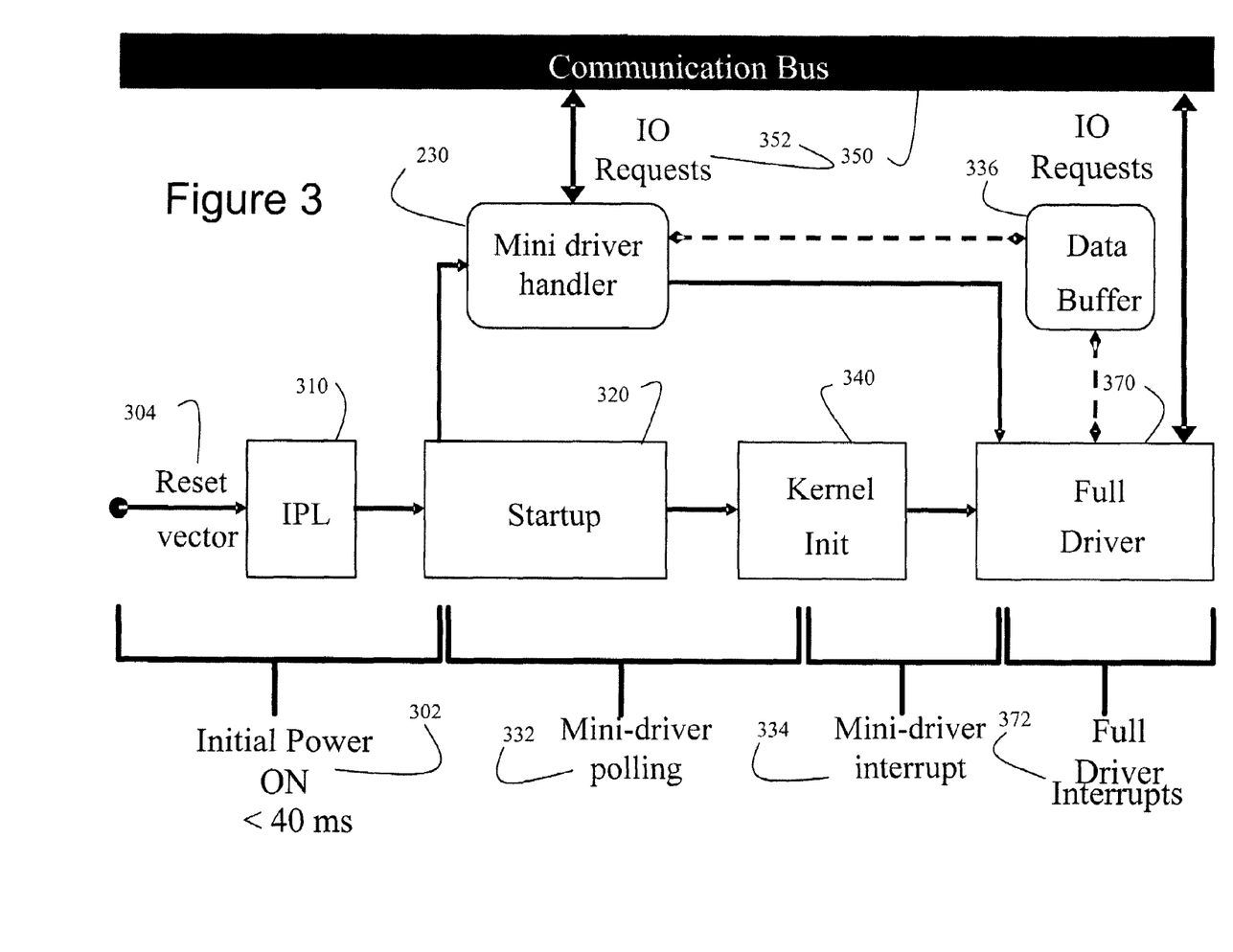
FIG. 3 shows exemplary real-time operating system boot timing requirements.

An exemplary RTOS boot process time line diagram 300 in a system for meeting demanding boot time requirements in vehicle telematics systems is shown in FIG. 3. Initially, the RTOS may begin booting at power-on 310. At this point, the CPU is reset and initial power-on code is executed. This code may include an Initial Program Loader (IPL) 310, which may be located at the system's reset vector 312, may enable a computer to start the operating system and may provide code to communicate with the various devices in the system, such as disk drives, keyboard, monitor, printer, communications ports, and the like. For example, the reset vector 312 may include the Basic Input Output System (BIOS) on a personal computer. These instructions also may include instructions for initializing a boot loader, for example the startup program 320. Once the boot loader is operational, it may perform various bootstrapping-related tasks, such as copying the OS image, booting the OS, and handling input/output (I/O) requests. The initial power-on code also may include instructions for initializing a mini-driver 230.

Figure 4:
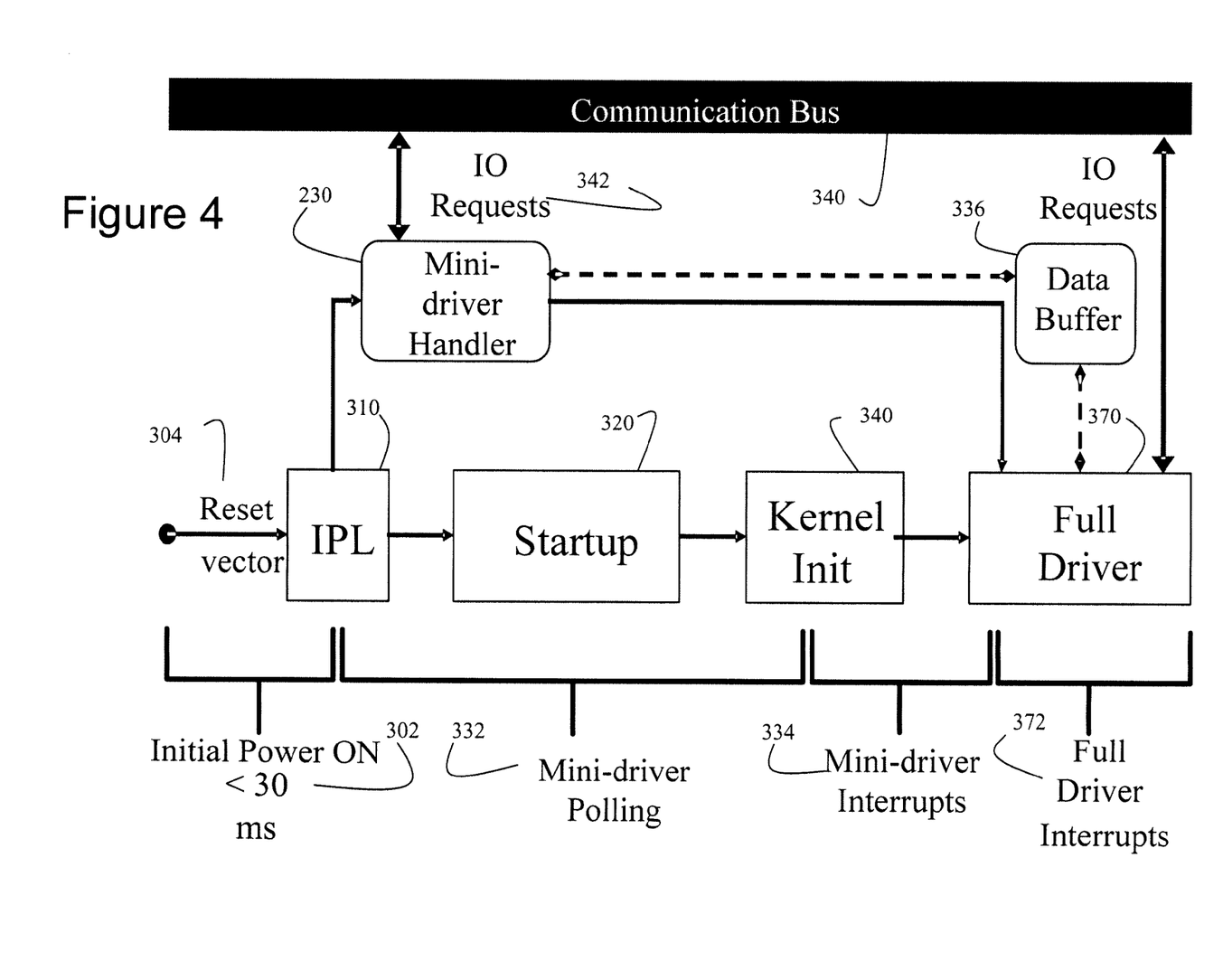
FIG. 4 shows another exemplary real-time operating system boot timing requirements.

The mini-driver 230 may provide any and/or all of the functionality of a typical device driver. As illustrated, the mini-driver 230 provides the ability to initialize a peripheral device, making it useable throughout the booting process 300. Once initialized, the mini-driver 230 may be used to meet timing constraints placed on the system, for example, by reading and, if necessary, replying to messages 342 received over the peripheral bus 340. As the boot process 300 completes, the system may transition from the IPL 310 to a Startup program 320 that may be responsible for additional boot processes, such as initializing hardware and building a System Page, and then to a kernel Init phase 350 where the operating system kernel is initialized. Throughout this process, the mini-driver 230 may be polling 332 or responding to interrupts 334 as required. Polling 332 and interrupts 334 are described in more detail below. Optionally, the mini-driver 230 may pass collected data through a message buffer 336 to the full device driver 370, which may take over control from the mini-driver once it 370 is operational. At this point, full driver interrupts 372 may be used. The mini-driver 230 also may be initialized later in the boot process 300, such as by the Startup program 320 as shown in FIG. 4. It should be noted that the term mini-driver 230 is used merely to differentiate between a typical device driver 370 loaded by the RTOS after the RTOS has loaded. The term mini-driver is not intended to be limiting in any way. Additionally, although the mini-driver 230 is shown as polling 332 early in the boot process 300 and being interrupt driven 334 later, the figures are merely exemplary as the mini-driver 230 may be triggered using any known manner at any time after initialization including a not directly related but periodic time based interrupt.

Figure 5:
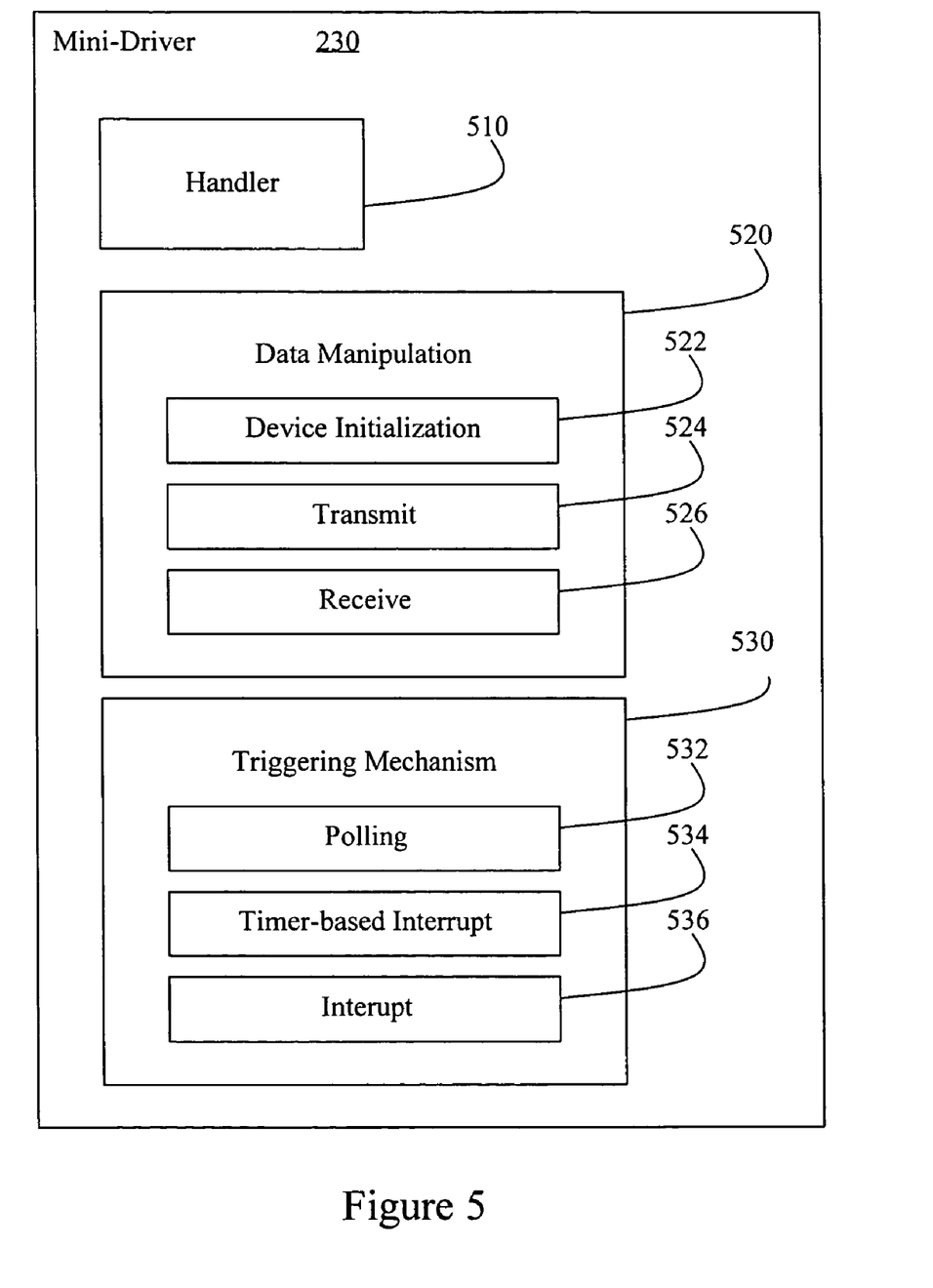
FIG. 5 shows an exemplary logical architecture for an mini-driver.

An exemplary logical architecture for an exemplary mini-driver 230 is shown in FIG. 5. Logically, the mini-driver 230 may include two components: a handler 510 and data manipulation features 520. The handler 510 acts as an external interface to the boot process 300 and may include code segments for performing any type of device-specific functionality. The handler 510 may be callable at any phase of the boot process 300. The handler 510 may be a custom function that is designed to meet specific application timing requirements. Alternatively, or additionally, standard or generic handlers 510 may be implemented.

As an interface, the handler 510 may provide access to a wide variety of functionality, such as data manipulation features 520. For example, an exemplary handler 510 adapted to allow read and write access to a peripheral device, such as a CAN or MOST bus controller is shown in Table 1.0. In that case, the data manipulation features 520 may be used to store message data to a block of memory accessible to the handler 510. For example, data may be stored to buffer messages received by a device, such as messages from a CAN bus master device. Alternatively, other data manipulation functions 520 also may be provided, such as converting messages, extracting message data, forwarding messages to additional devices/software, and the like. Such functions may be mandated by timing requirements, application requirements, and the like.

TABLE 1.0

Exemplary Handler Psuedocode

```
void minidriver_handler (void *data, int *count, int flag)
{
...
// Check if device has data to be read
if( receive_function(data, count) )
{
// Transmit "canned" response
transmit_function(CAN_MSG_REPLY);
}
...
// Determine if we have timed out waiting for our initial CAN bus message
if( *count == 0 &&
timer_difference(mdrvr_start_time) > MAX_TIME)
{
// Abort boot process and power down the CPU to minimize power draw
cpu_power_down( );
...
}
...
}
```

To implement these functionalities, the handler program 510 may use a variety of provided data manipulation functions 520. These functions 520 may be device specific and may be internal to the mini-driver 230. Alternatively, the standard or generic functions 520 may be provided that may be used to service multiple devices. Additionally, data manipulation features may be provided by functions 520 that are external to the mini-driver 230. For example, three functions 520 may be provided to allow a device to send and receive messages on a bus: a device initialization function 522, a transmit function 524, and a receive function 526.

The device initialization function 522 may initialize a particular device, if necessary. Typical hardware or device initialization functions may include configuring hardware registers, device specific clocks, and/or queues, as well as enabling device interrupts and the like. The device initialization function may be called once, the first time a mini driver 230 is called, or may be called throughout the life of the mini-driver. As used herein, the life of the mini-driver 230 is defined as the period from initialization of the mini-driver 230 to the disabling of the mini-driver 230.

The transmit function 524 may transmit data from the device associated with the mini-driver 230. The function 524 may transmit data of any size, which may vary depending on the particular device being serviced. For example, transmission of a piece of data for a typical serial device may include a single byte, while multi-byte messages may be transmitted for a CAN master device driver.

The receive function 526 may check if data is available to be read from the device. If data is available, the receive function 526 may store the received data into the mini-driver's 230 data area. The receive function 526 also may maintain a total byte count of received data. For example, the receive function 526 may be given, the location in memory where the mini-driver data is to be stored and the current number of bytes in the mini-driver data buffer, and may return either a zero if there is no new data available, or the number of new bytes stored. The location in memory may be a hard-coded, pre-defined physical memory address that may be chosen so as not to interfere with other system resources.

In addition to establishing and providing data manipulation features 520, the mini-driver 230 also may include additional logic for providing other functionalities. For example, the handler 510 may be called throughout the boot process 300 and ensure that messages are not missed. Functions that poll for timeouts and the like may be provided to enable user-customization of the mini-driver's 230 behavior. There may be three triggering mechanisms to drive the mini-driver handler 230: 1) a polling mechanism 532; 2) a timer interrupt based polling 534; and 3) a device interrupt mechanism 536. Alternatively, the handler 510 may be triggered using any known manner. Each trigger mechanism may be implemented independently, or a combination of trigger mechanisms may be used throughout the boot process 300. A flag may be passed into the handler 510 that denotes the mechanism used to call the handler in a particular instance. For example, a flag value of MINIDRVR_FLAG_POLLED may indicate that the handler was called directly, a value of MINIDRVR_FLAG_TIMER_IRQ may indicate that the handler 510 was called via a timer interrupt, and a value of MINIDRVR_FLAG_DEVICE_IRQ may indicate that the handler 510 was called via a device interrupt. Using flags, the behavior of the mini-driver 230 may be optimized for each phase of the boot process 300.

The polling mechanism 532 may continually interrogate the peripheral device to see if it has data or messages. For example, the system may call the handler 510 at various instances throughout the boot sequence 300 to determine if data has been received from the device. The boot code strategically may place function calls to the handler 510 throughout the boot process 300. Alternatively, or additionally, a system timer may be used to create a sense of time to determine when the device should be polled 532.

The timer interrupt based polling mechanism 534 may be a combination of polling mechanisms 532 and interrupt based systems 536. For example, the mini-driver handler 510 may be attached as a quasi-interrupt handler based off of a system timer. In such a case, the mini-driver may be in a polling mode but with the advantage that the handler 510 will not have to be explicitly called throughout the boot process 300. Rather, the timer mechanism may be configured to generate interrupts at the maximum data rate specified by the system's requirements. Alternatively, or additionally, interrupts may be generated at any rate.

Finally, the device interrupt triggering mechanism 536 may attach the mini-driver handler 510 directly to the device's interrupt 536 source. In such a scenario, the system may avoid polling altogether. The interrupt based triggering mechanism 536 may eliminate the need for adding polling or timer code to the boot process 300, but interrupt based triggering may not be possible in all systems or throughout the entire boot process 300. Alternatively, or additionally, the mini-drive handler 510 may use any combination of triggering mechanisms throughout the boot process 300 or during the mini-driver's 230 life.

These triggering mechanisms may be provided in a variety of ways. For example, functions may be provided to initialize interrupts, attach interrupt handlers, initialize timers, obtain the current timer values, and determine elapsed times. These functions may be specific to the particular device and system being used, or may be platform independent. In order to initialize interrupts, the mini-driver 230 may need to perform CPU and board-specific tasks. These tasks may include configuring the CPU to accept interrupts and configuring an interrupt controller to generate interrupts for the device associated with the mini-driver 230. To attach an interrupt handler 410, an exception table 232 may be created and configured to call the handler 510 when a mini-driver interrupt fires. As known in the art, the exception table may have to be stored at particular locations in memory depending on the underlying platform. To initialize timers, the desired timer resolution may be established. Timers may be used generally by the mini-driver 230, or may be configured as interrupt timers. Optionally, a flag may be used to enable and/or disable timer interrupts. For example, a flag value of MDRVR_TMR_INTR_ENABLE may enable timer interrupts, while a value of MDRVR_TMR_INTR_DISABLE may disable timer interrupts.

As described above, mini-drivers 230 may include data storage functionality that may be required to buffer received data. This buffered data then may be passed to the full driver 370 once it has loaded. The amount of data being buffered, and the amount of memory that should be allocated for buffering, may vary depending on hardware and/or software requirements. A user may specify any memory location for data buffering, such as any location in RAM, or safe or protected areas of memory may be reserved for mini-driver 230 buffering. This location should be made known to the kernel 214 so that the memory is not overwritten or allocated to a system or user application. If an area of RAM is allocated for mini-driver data storage, this allocation process should be performed after the RAM has been initialized. The mini-driver 230 allocated memory may not be internally managed by the system. Rather, the mini-driver 230 itself may be responsible for ensuring the integrity of memory, and ensuring that the system memory is not overwritten. Alternatively, mini-driver 230 allocated memory may be managed along with system memory. The memory allocated to the mini-driver 230 may be freed after the mini-driver 230 has transitioned to the full driver 370.

Figure 6:
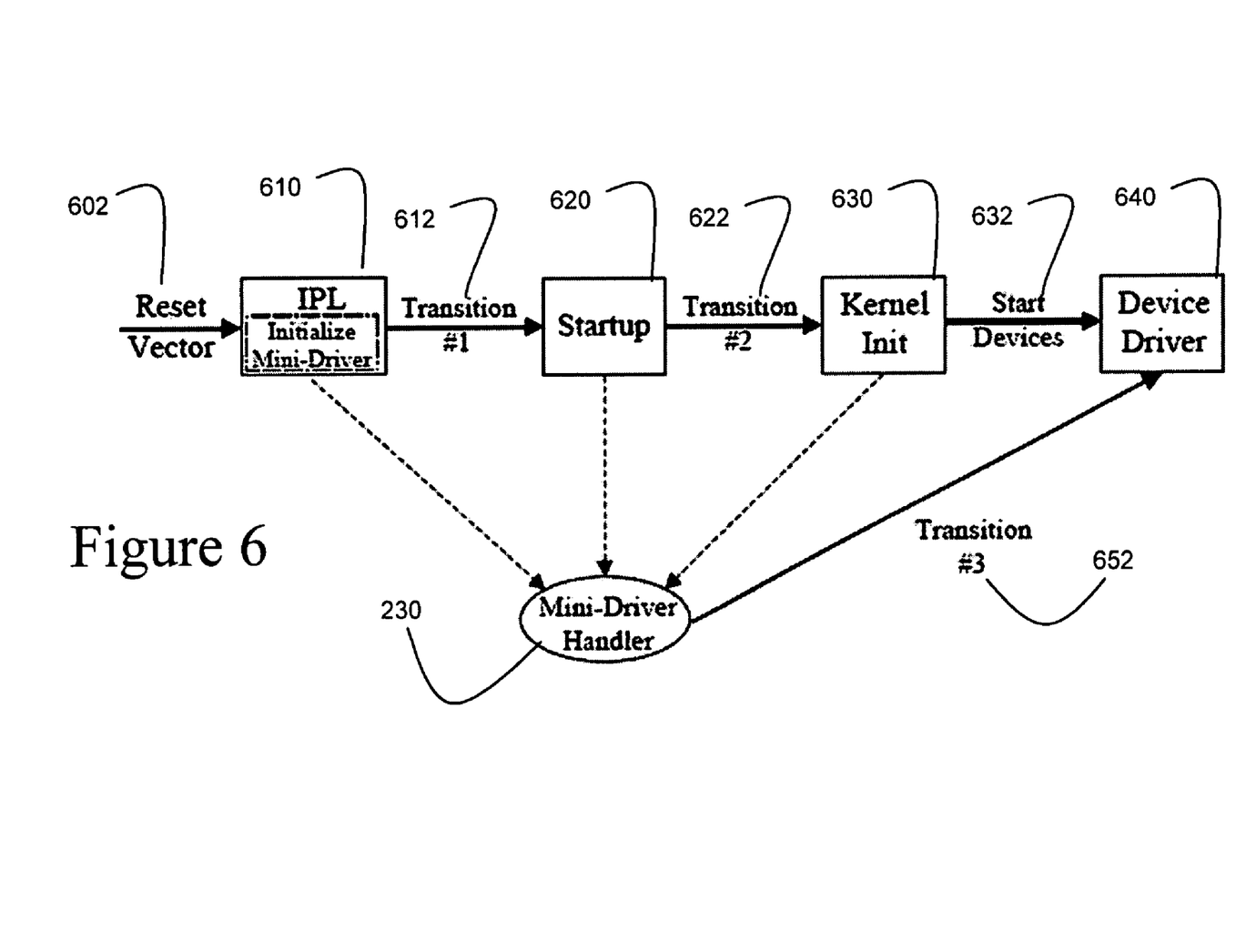
FIG. 6 depicts exemplary relationships between phases of a boot process and a mini-driver.

Referring now to FIG. 6, a diagram depicting the relationship between phases of an exemplary boot process 600 and the mini-driver transition processes is shown. As illustrated, the exemplary boot process 600 may be the boot process of the QNX Neutrino RTOS, a distributed operation system provided by QNX Software Systems Ltd. of Kanata, Ontario, Canada. The boot process 600 may include various phases. For example, the QNX Neutrino boot process is divided into three phases: an Initial Program Loader (IPL) phase 610, a Startup phase 620, and a kernel Init phase 630. These phases, and the boot process functions performed during these phases, are merely exemplary and are not intended to limit the scope of the claims.

The mini-driver 230 may be initialized during any phase of the boot process 600, which may be necessitated by boot time requirements. For example, the mini-driver 230 may be initialized during the IPL phase 610 for systems with more demanding timing requirements. For systems with less stringent booting requirements, the mini-driver 230 may be initialized during the Startup 620 or kernel Init 630 phase. Alternatively, the mini-driver may be initialized only in certain boot phases. For example, initialization of the mini-driver 230 may be restricted to a particular phase of the boot process 600, such as the Startup phase 620. Depending on which phase of the boot process 600 a mini-driver 230 is initialized, various transitional actions also may be required to ensure that the mini-driver 230 may be called throughout the boot process 300.

Figure 7:
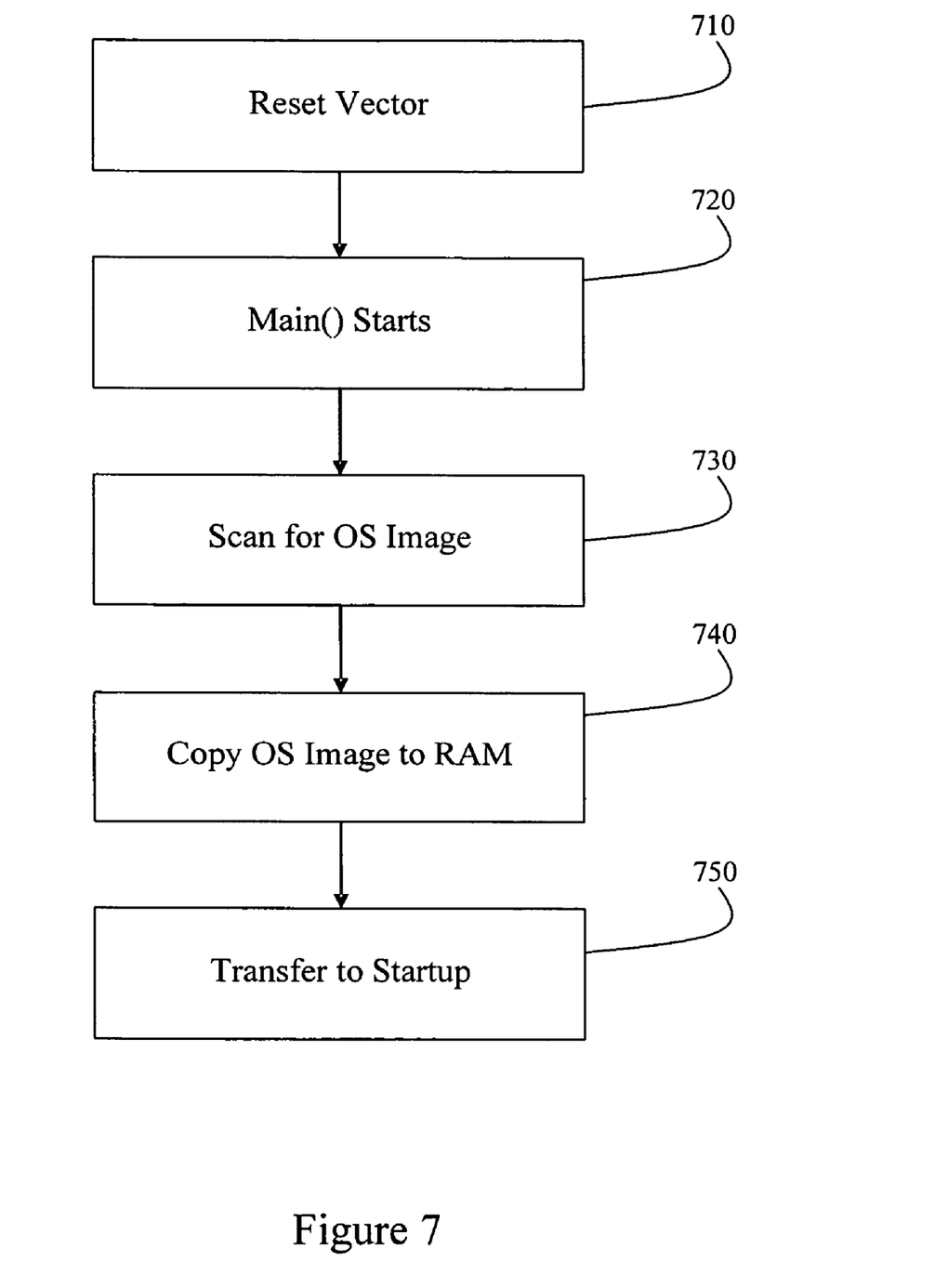
FIG. 7 is a flow chart depicting an exemplary process flow for an Initial Program Loader phase of a boot process.

Initially, the boot process 600 may include executing instructions located at the system's reset vector 602. This phase of the boot process 600 may be referred to as the IPL phase 610, and may include instructions for initializing hardware clocks and memory, and copying the OS image into RAM. An exemplary flow chart depicting a typical IPL phase 610 process flow is shown in FIG. 7. As illustrated, the IPL phase 610 may include executing instructions located at the system's reset vector at step 710. These instructions may include assembly code to configure the system clock, configure memory controllers, and the like. Next, a main function may begin executing at step 720. The main function may be responsible for managing the remainder of the IPL phase 610. Such functions may include scanning the system for the OS image at step 730, copying the OS image to RAM at step 740, and transitioning to the Startup boot phase at step 750.

Figure 8:
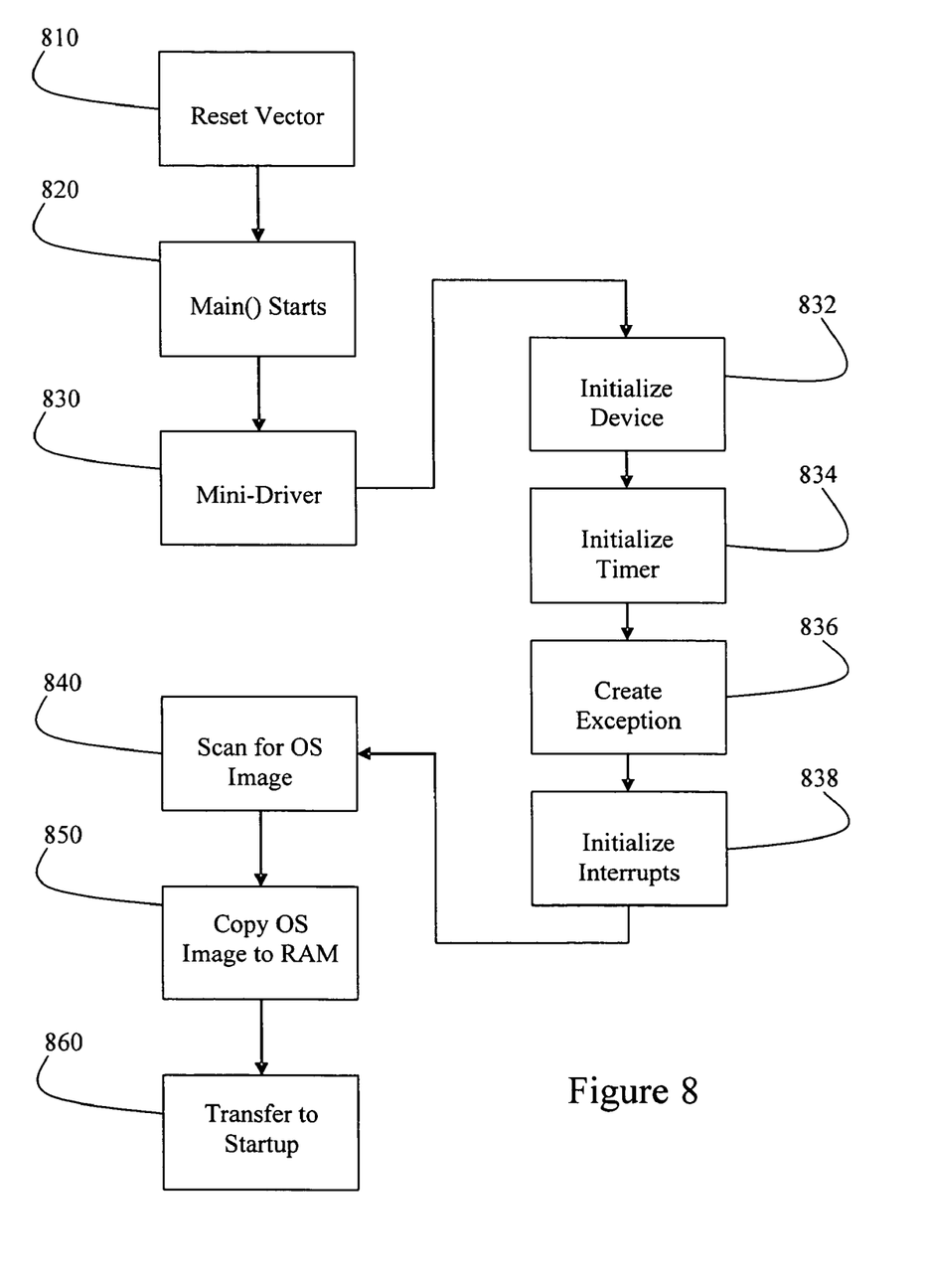
FIG. 8 is a flow chart depicting an exemplary process flow for an Initial Program Loader phase of a boot process that initializes a mini-driver.

In order to initialize a mini-driver during the IPL phase 610, additional steps may be taken. FIG. 8 is an exemplary flow chart depicting an IPL phase that initializes a mini-driver 230. As illustrated, the IPL phase 610 again begins by executing reset vector instructions at step 810, after which the IPL main function may begin at step 820. At this point, the mini-driver may be initialized at step 830. Initializing the mini-driver 230 at this point in the IPL phase 610 may meet most extreme timing requirements. In those extreme situations in which the mini-driver needs to be initialized before the IPL phase 610, the mini-driver 230 may be initialized earlier in the boot process. The IPL phase 610 then may continue performing standard processes, such as scanning for the OS image at step 840, copying the OS image to RAM at step 850, and transferring control to the Startup program at step 860. It should be noted that the handler 510 may also have to be called at various stages throughout the remainder of the IPL phase 610 if the mini-driver 230 is not to be interrupt driven (not shown).

To initialize a mini-driver 230, various actions may be performed. These actions may include initializing device hardware to allow for data transmission and reception, initializing system resources, and the like. As illustrated, the device may be initialized at step 832, a timer mechanism may be initialized at step 834, an exception for the device may be created at step 836, and interrupts may be initialized at step 838.

Alternatively, or additionally, other actions may be performed to initialize. These actions may be dependent on the particular device being initialized, the hardware platform being utilized, and/or other system information. Steps 832, 834, 836, and 838 may be performed using the device initialization, timer initialization, exception creation, and interrupt initialization functions described above. Alternatively, or additionally, other functions may be used to initialize the mini-driver 230.

Figure 9:
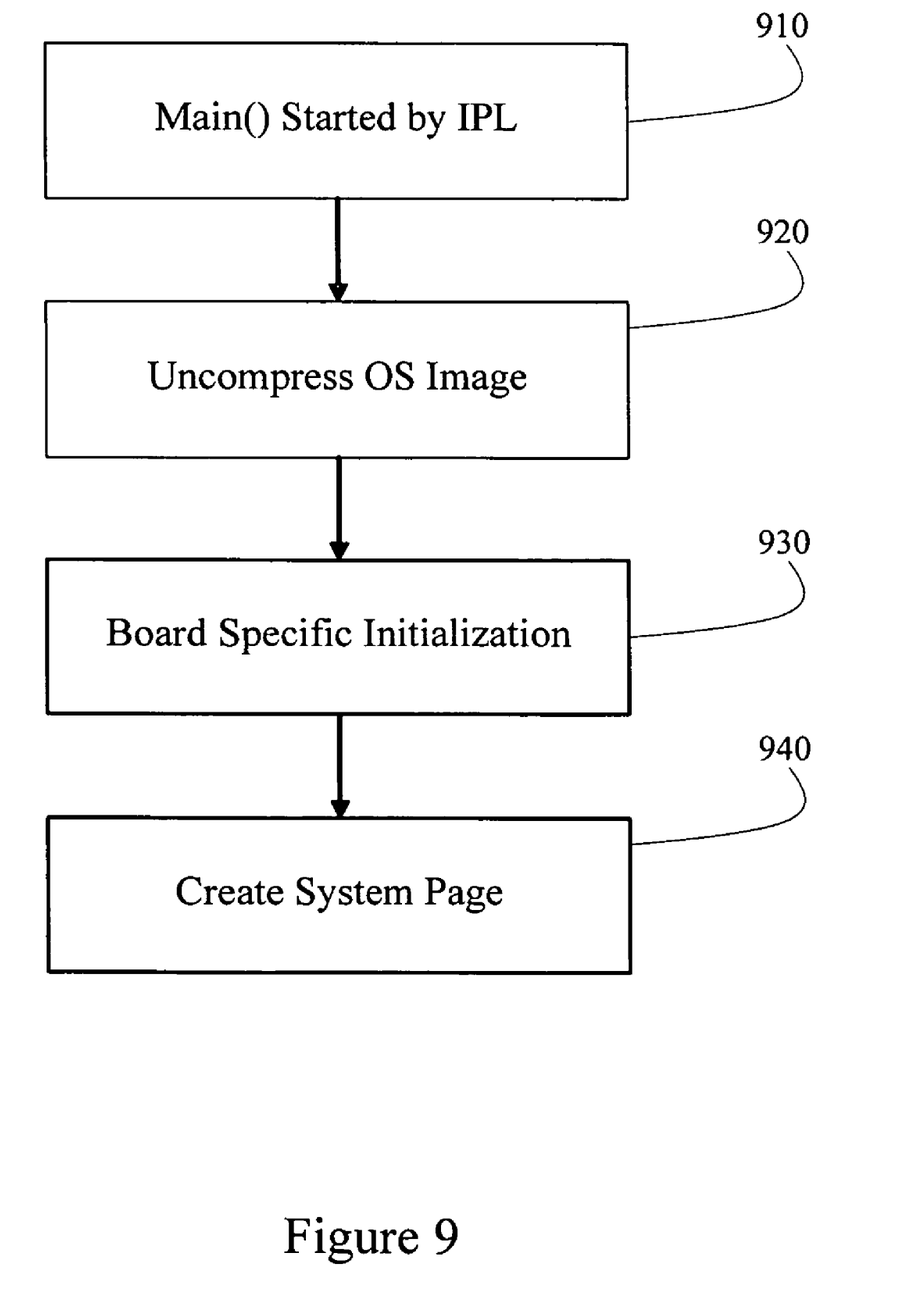
FIG. 9 is a flow chart depicting a typical process flow for Startup program phase of a boot process.

Once the IPL phase 610 is complete, a transition (612) may occur to pass control of the boot process to a Startup program 620. The Startup program 620 may be responsible for additional boot processes, such as initializing hardware and building the System Page, a data structure required by the kernel that describes the hardware resources of the system. An exemplary Startup program 620 process flow chart 900 is shown in FIG. 9. As illustrated, the Startup phase may begin when it's main function is invoked by the IPL at step 910. Next, the OS image is uncompressed, if necessary, at step 920. Board specific initialization tasks may be carried out at step 930, and the System Page may be generated at step 940. Alternatively, or additionally, the Startup program 620 may perform other tasks.

If the mini-driver 230 is initialized during the IPL phase 610, this transition 612 may include passing information from the IPL 610 to the Startup program 620. This information may depend upon the triggering method. For example, if the mini-driver 230 is interrupt driven, the Startup program 620 may need to call the handler 510 periodically to poll the device and thus may need information regarding the handler 510. A mini driver startup information structure may be used to pass information from the IPL 610 to the Startup program 520. An exemplary mini driver startup information structure is shown in Table 1.0. As shown, the startup information structure may include data elements that define the address of the handler 510, the size of the handler 510, the location of the allocated RAM, the size of the mini driver data, the address of an integer used to denote the total number of bytes stored by the mini driver 230, a minimum polling time, interrupt information, the location of an exception handler, information about current handle function triggering mode, and the like. Alternatively or additionally, other data may be included in the startup information structure. An IPL function call may be defined to easily populate the startup information structure before transitioning 612 control to the Startup program 620.

TABLE 2.0

Exemplary Startup Information Structure Data Elements

| | |
|---|---|
| uint32_t handler | The address of the handler |
| uint32_t handlersize | The size of the handler |
| uint32_t data | The address of mini-driver data in RAM |
| uint32_t datasize | The size of the mini driver data |
| uint32_t handlerdatacnt | The address of an integer used to denote the total number of bytes stored by the mini driver |
| uint32_t msec | A minimum polling time |
| uint32_t irq | Interrupt information |
| uint32_t exceptptr | The location of the exception handler |
| uint32_t flags | Information about the current handler triggering mode |

Alternatively, the mini-driver 230 may be initialized in the Startup phase 620 of the boot process. The mini-driver initialization process may include similar steps regardless of when the initialization occurs, whether in the IPL 610 or Startup phase 620. As described above, the mini-driver initialization process may include initializing the device, supplying receive and transmit functions as well as handlers, possibly initializing timers and interrupts, and the like. Depending on timing requirements, the mini-driver 230 may be initialized at any point in the Startup phase 620.

Referring again to FIG. 6, the Startup program 620, once complete, may transition 622 control to the kernel Init phase 630 that will initialize the kernel 214 and start user applications 632 such as standard device drivers 370. If the mini-driver 230 has been initialized in either the IPL 610 or Startup 620 phase, information about the mini-driver 230 may need to be passed to the kernel Init phase 630. This information may be passed, for example, by creating a new entry in the System Page 216. To simplify this process, a function may be created that may be called by the Startup program 620 to indicate to the kernel 214 information about any initiated minidrivers. This function may be called for each mini-driver 230 that is active, or the function may be called once for all mini-drivers 230. Each call may, for example, dynamically create an entry in the mini-driver section of the System Page 216, store the necessary information into a structure for handler 510, and reserve memory associated with the mini-driver data. It should be noted that the contents of this memory should not be cleared since it may already contain valid mini-driver data, such as received message and the like. An exemplary mini-driver System page 216 entry and handler structure are shown in Tables 3.0 and 4.0, respectively.

TABLE 3.0

Exemplary System Page Entry Information

```
struct syspage_entry {
...
syspage_entry_info smp;
syspage_entry_info pminfo;
syspage_entry_info mdrvrinfo;
...
}
```

TABLE 4.0

Exemplary Handler Structure Data Elements

| | |
|---|---|
| uint32_t handler | The address of the handler |
| uint32_t handlersize | The size of the handler |
| uint32_t data | The address of mini-driver data in RAM |
| uint32_t datasize | The size of the mini driver data |
| uint32_t datacnt | The address of an integer used to denote the total number of bytes stored by the mini driver |
| uint32_t msec | A minimum polling time |
| uint32_t irq | Interrupt information |
| uint32_t exceptptr | The location of the exception handler |
| uint32_t spare[3] | Reserved space for additional data elements |

The kernel Init phase 630 may be responsible primarily for initializing the kernel 214, which then may start user applications 632, such as standard device drivers 370. However, the mini-driver timing requirements still should be met throughout this phase of the boot process 600. A mini-driver dark period is the time between polls of the mini-driver handler 510 with interrupts disabled during any phase of the system initialization. During a dark period, the mini-driver cannot respond to hardware events on the peripheral device. The length of the dark periods must be small enough to ensure that no hardware events are missed at the expected interval rate of the peripheral device. The longest mini-driver 230 dark period through the kernel Init phase 530 may define the maximum data rate the mini-driver 230 may support. Alternatively, the maximum data rate may be chosen using any known method. Information relating to the mini-driver handler 510, such as the handler's 510 current interrupt (if any), as well as the maximum dark time, may be maintained. For example, if the mini-driver 230 is not interrupt driven, or if the kernel Init 630 attempts to disable interrupts at any point, the kernel 214 should ensure that the mini-driver timing requirements are still met, which may require the ability to handle interrupts already enabled. For example, a temporary exception table may be created for the mini-driver 230 during either the IPL 610 or Startup program 620. This information then may be transferred from the temporary table to the real exception table, which is created during the kernel Init phase 630. The kernel Init phase 630 may call the mini-driver handler 630 at various times throughout this process to meet timing requirements of the mini-driver 230. This assumes that the time to create the new exception table will be less than the maximum dark period. Once the real exception table has been created, the kernel 214 may allow the mini-driver's 230 interrupt (whether timer or driver interrupt driven) to continue operating. For example, the mini-driver handler 510 may be transferred to the real exception table 218. The kernel Init phase 630 then may enable all interrupts after migrating to the real exception table. Alternatively, or additionally, interrupts may be handled using any known method. Additionally, there may be other periods during the kernel Init phase 630 in which interrupts may be disabled.

Depending on how the CPU is configured to handle exceptions, the IPL 610 may set, such as by programming the CPU's vector-base-register (VBR), the location of a temporary exception table at an arbitrarily chosen location in RAM (not at the real exception table location), like on an SH platform. An SH platform is any computer system that uses a 32-bit SH microprocessor produced by Renesas. The Startup program 620 then may set the VBR to the location of the real exception table before transferring control to the kernel Init phase 630. For example, the mini-driver's 230 temporary exception table may be disabled before the transition 622 to the kernel Init phase 630.

Once the kernel 214 has booted and the real device driver 640 is operational, the mini-driver 230 may transition control 652 to the real device driver 640. For example, the driver 640 may include a command line option notifying it of the mini-driver 230 and triggering the various operations required to transition control 652. Exemplary transition activities may include altering the initialization of the hardware, which should be at least partially enabled, recovering valid data from the hardware's FIFO's or buffers, and adding data from the mini-driver's memory store, the address of which may be retrieved from the System Page 216, to its internal data buffers in order to make it available to client applications. The real device driver 640 also may require a smooth transition between the mini-driver's interrupt 510 and its own interrupt handler. For example, a flag may be used to have the kernel 214 replace an existing interrupt handler with a new one. Once the real device driver 640 has replaced the interrupt handler and read the mini-driver's data, the mini-driver's data memory may be freed up or otherwise reallocated.

Figure 10:
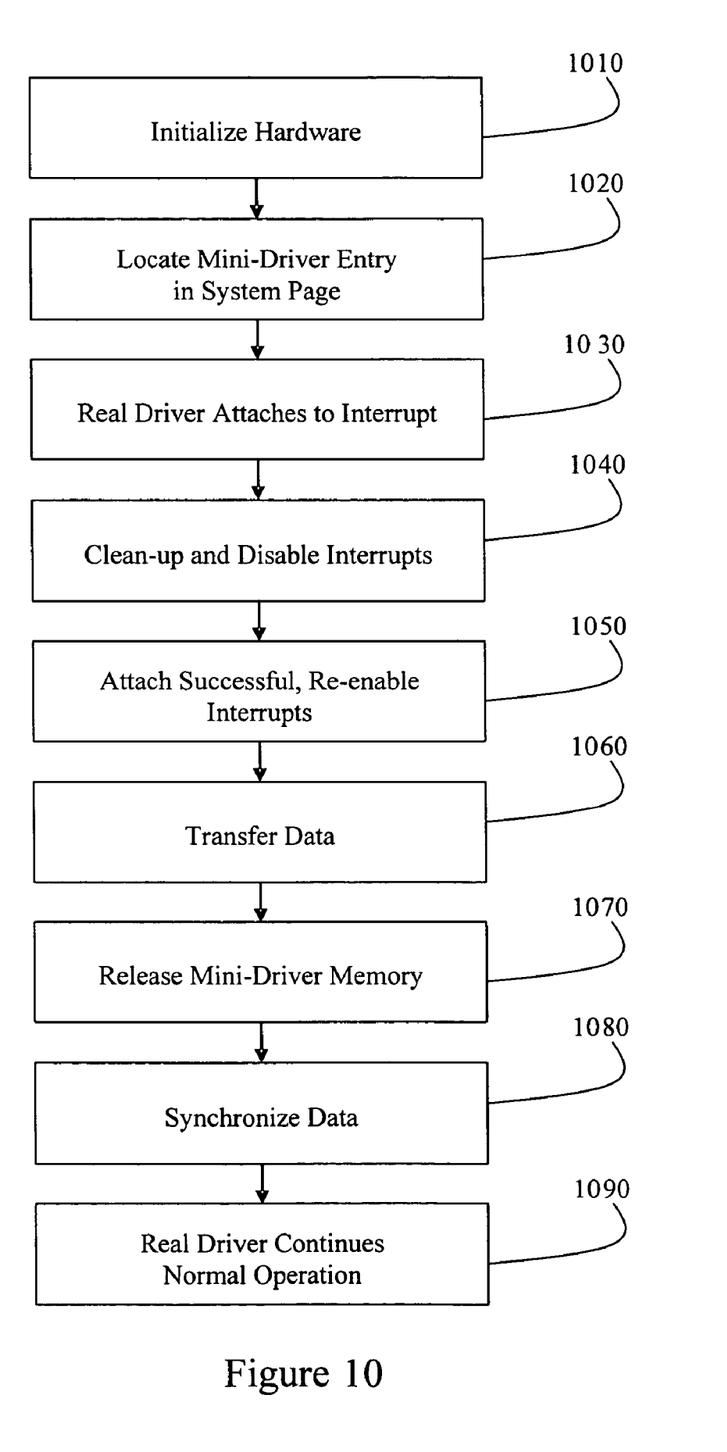
FIG. 10 is a flow chart depicting an exemplary transition from a mini-driver to a typical device driver.

An exemplary transition 652 to a real device driver 370 FIGS. 3. and 4. from a mini-driver 230 is shown in FIG. 10. As illustrated, the transition 652 of FIG. 6. may begin by initializing the hardware, either fully or partially, at step 1010. Next, the driver 370 may locate the mini-driver entry in the System Page at step 1020 and attach to its interrupt at step 1030. The mini driver 230 next may perform any cleanup necessary and disable the device interrupt at step 1040. If the full driver 370 was able to successfully attach to the interrupt, the interrupt may be re-enabled at step 1050. Mini-driver 230 data may be transferred into the real driver's 370 receive buffer at step 1060. Optionally, the mini-driver 230 data memory may be reallocated at step 1070. Finally, the mini-driver data may be synchronized with any new data received by the real driver 370 at step 1080 before the real driver 370 begins normal operation. The real driver 370 may copy the mini-driver data stored in the mini-driver storage buffer into the real driver's 370 data buffer. The synchronization of mini-driver data and new data may be performed seamlessly so that data appears in the correct order in which it was received from other applications in the system. For example, the real driver 370 may receive interrupts from the hardware indicating that new data has been received while the mini-driver data in the storage buffer 336 is copied into the data buffers of the real driver 370. The real driver 370 must be able to manage the copying of the mini-driver storage buffer 336 while this new data is received from the hardware. The real driver 370 may also keep the data synchronized. The real driver 370 can keep the data synchronized and create a seamless transition by copying the mini-driver data to the beginning of the real driver 370 data buffer and adding new data received to the end of the real driver 370 data buffer. This will allow other applications to access the data received by the mini-driver 230 first before accessing new data received by the real driver 370.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for operating a computer system, the computer system including an operating system, memory, and at least one peripheral device, the method comprising:
    loading a first device driver for the at least one peripheral device prior to loading the operating system, the first device driver operating to initialize the peripheral device and associate the peripheral device with an interrupt;
    loading a second device driver for the at least one peripheral device after loading of the operating system;
    transitioning control of the peripheral device to the second device driver by
        attaching the second device driver to the interrupt,
        disabling the interrupt,
        re-enabling the interrupt for use by the second driver, and
        transferring data associated with the first driver to the second driver.

2. The method of claim 1, where transitioning control of the peripheral device to the second device driver further comprises synchronizing the transferred data with data obtained by the second device driver.

3. The method of claim 1, where the device driver is loaded before an image of the operating system is copied into memory.

4. A method for servicing at least an input/output request during the boot process of a computer system, the computer system including an operating system including a kernel module and at least one peripheral device, where the at least one peripheral device is responsive to input/output requests, the method comprising:
    loading, prior to loading the kernel module, a first device driver associated with the at least one peripheral device, the device driver including
        a handler for servicing the at least one input/output request, the handler callable throughout the boot process, and
        a data manipulation component in communication with the handler and operable to manipulate data associated with the at least one input/output request;
    loading a second device driver for the at least one peripheral after loading of the kernel module;
    transitioning data manipulated by the data manipulation component to the second device driver;
    creating a temporary exception table for servicing the input/output requests with the first device driver;
    creating, by the kernel module, a second exception table for servicing the input/output requests with the second device driver; and
    transitioning exception information from the temporary exception table to the second exception table.

5. A method for operating a computer system having an operating system and at least one peripheral component adapted to handle input and/or output data requests, the method comprising:
    loading a first device driver for the at least one peripheral component to handle input and/or output data requests prior to loading of the operating system;
    storing data received and/or transmitted using the first device driver;
    loading a second device driver for the at least one peripheral device after loading the operating system;
    transitioning control of the at least one peripheral device from the first device driver to the second device driver; and
    transitioning the data received and/or transmitted using the first device driver to the second device driver.

6. The method of claim 5, where the first device driver is responsive to a first triggering mechanism and the second device driver is responsive to a second triggering mechanism, where the first and second during mechanisms differ from one another.

7. The method of claim 6, where transitioning control comprises transitioning control from the first triggering mechanism to the second triggering mechanism.

8. The method of claim 5, where the first device driver is responsive to a first triggering mechanism and the second device driver is responsive to a second triggering mechanism, where the first and second during mechanisms are substantially identical.

9. The method of claim 5, where the first and second device drivers are adapted to control messaging associated with the at least one peripheral device.

10. A method for operating a computer system having an operating system and at least one peripheral component adapted to handle input and/or output data requests associated with communications on a bus, the method comprising:
    loading a first device driver for the at least one peripheral component to handle input and/or output data on the communications bus prior to loading of the operating system;
    storing data received and/or transmitted using the first device driver;
    loading a second device driver for the at least one peripheral device after loading the operating system;
    transitioning control of the at least one peripheral device from the first device driver to the second device driver; and
    transitioning the data received and/or transmitted using the first device driver to the second device driver.

11. The method of claim 10, where the first device driver is responsive to a first triggering mechanism and the second device driver is responsive to a second triggering mechanism, where the first and second during mechanisms differ from one another.

12. The method of claim 11, where transitioning control comprises transitioning control from the first triggering mechanism to the second triggering mechanism.

13. The method of claim 10, where the first device driver is responsive to a first triggering mechanism and the second device driver is responsive to a second triggering mechanism, where the first and second during mechanisms are substantially identical.

* * * * *